United States Patent [19] [11] 4,412,939
Shipley et al. [45] Nov. 1, 1983

[54] REACTION PRODUCTS OF TRANSITION METAL COMPOUNDS AND BORON COMPOUNDS AND CATALYSTS PREPARED THEREFROM

[75] Inventors: Randall S. Shipley, Alvin; Larry E. Freyer, Richwood, both of Tex.

[73] Assignee: The Dow Chemical Company, Midland, Mich.

[21] Appl. No.: 353,301

[22] Filed: Mar. 1, 1982

[51] Int. Cl.$^3$ ................................................. C08F 4/64
[52] U.S. Cl. ..................................... 502/115; 526/125; 526/133; 502/131; 502/132; 502/134
[58] Field of Search ............ 252/429 A, 429 B, 429 C

[56] References Cited

U.S. PATENT DOCUMENTS

| | | | |
|---|---|---|---|
| 3,135,809 | 6/1964 | Bosmajiano | 252/429 A X |
| 3,166,542 | 1/1965 | Orzechowski et al. | 252/429 A X |
| 3,677,911 | 7/1972 | Mottus et al. | 252/429 A X |
| 3,943,067 | 3/1976 | Chan et al. | 252/429 C X |
| 4,120,820 | 10/1978 | Birkelbach | 252/429 B |
| 4,213,880 | 7/1980 | Knight et al. | 252/431 R |
| 4,250,286 | 2/1981 | Shipley | 526/125 |
| 4,269,733 | 5/1981 | Shipley | 252/429 B X |

OTHER PUBLICATIONS

U.S. Appl. Ser. No. 313,867 C–30,182, filed 10-22-82 by R. S. Shipley and Donald Floyd Birkelbach, Process for Polymerizing Alpha–Olefins.
U.S. Appl. Ser. No. 313,869 C–29,681, filed 10-22-81 by R. S. Shipley and Donald Floyd Birkelback, Process for Polymerizing Alpha–Olefins.
U.S. Appl. Ser. No. 313,868 C–29,601, filed 10-22-81 by R. S. Shipley and Donald Floyd Birkelback, Ultra High Efficiency Catalyst for Polymerizing Olefins.

*Primary Examiner*—Patrick P. Garvin
*Attorney, Agent, or Firm*—J. G. Carter

[57] ABSTRACT

Compositions consisting of the reaction product or complex resulting from the mixing of a transition metal compound such as a tetraalkoxy titanium compound and a boron compound such as a trialkyl boron compound are useful in the preparation of catalysts for polymerizing α-olefins exhibiting ultra-high efficiencies at high polymerization temperatures.

13 Claims, No Drawings

REACTION PRODUCTS OF TRANSITION METAL COMPOUNDS AND BORON COMPOUNDS AND CATALYSTS PREPARED THEREFROM

BACKGROUND OF THE INVENTION

This invention relates to precursors for and to new catalyst compositions useful for initiating and promoting polymerization of α-olefins and to a polymerization process employing such catalyst compositions.

It is well known that olefins such as ethylene, propylene and 1-butene, in the presence of metallic catalysts, particularly the reaction products of organometallic compounds and transition metal compounds, can be polymerized to form substantially unbranched polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirably high molecular weight polymers.

Following polymerization, it is common to remove catalyst residues from the polymer by repeatedly treating the polymer with alcohol or other deactivating agents such as aqueous base. Such catalyst deactivation and/or removal procedures are expensive both in time and material consumed as well as in the equipment required to carry out such treatment.

Furthermore, most of the aforementioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of such catalysts to become rapidly depleted or deactivated by the significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. No. 3,392,159, U.S. Pat. No. 3,737,393, West German Pat. Application No. 2,231,982 and British Pat. Nos. 1,305,610 and 1,358,437. While the increased efficiencies achieved by using these recent catalysts are significant, even higher efficiencies are desirable, particularly in copolymerization processes.

Even more recently, e.g. British Pat. No. 1,492,379, high efficiency catalysts have been employed which permit polymerization temperatures above 140° C. Such high polymerization temperatures provide for reduced energy requirements in solution polymerization processes in that the closer the polymerization temperature is to the boiling point of the polymerization solvent, the less energy that is required in removing the solvent.

The present invention provides for catalysts having higher efficiencies at these temperatures or higher polymerization temperatures at comparable efficiencies.

SUMMARY OF THE INVENTION

The present invention in one aspect is a transition metal-containing material suitable for use in the preparation of olefin polymerization catalysts which is the reaction product or complex formed by mixing at a temperature and for a time sufficient to provide a color change (a) a transition metal compound having at least one hydrocarbyloxy group attached to said transition metal and (b) a boron compound;

wherein the atomic ratio of B to transition metal (Tm) is at least about 0.1:1, preferably from about 0.2:1 to about 10:1 and most preferably from about 0.5:1 to about 2:1. Higher B:Tm ratios can be employed; however, no particular advantage is observed and the higher levels increase the cost of catalysts produced therefrom.

Another aspect of the present invention is catalysts for polymerizing α-olefins which comprise the catalytic reaction product of (A) the aforementioned reaction product or complex;
(B) a magnesium halide resulting from the reaction of
  (a) an organomagnesium component and (b) a halide source; and
(C) an organoaluminum compound, if required.

The components are employed in quantities which provide the composition with atomic ratios of the elements as follows:

Mg:Tm is from about 1:1 to about 200:1, preferably from about 2:1 to about 100:1, most preferably from about 5:1 to about 75:1.

Al:Tm is from about 0.1:1 to about 200:1, preferably from about 0.5:1 to about 150:1 and most preferably from about 1:1 to about 100:1.

Excess X:Al is from about 0.0005:1 to about 5:1, preferably from about 0.002:1 to about 2:1 and most preferably from about 0.01:1 to about 1.4:1.

Excess X is the amount of halide above that amount which is theoretically required to convert the organomagnesium component to magnesium dihalide.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene, mixtures thereof and the like. It is understood that α-olefins may be copolymerized with other α-olefins and/or with small amounts, i.e. up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40, weight percent of propylene, butene-1, hexene-1, octene-h, 4-methylpentene-1, 1,7-octadiene or similar α-olefin or diolefin based on total monomer.

Suitable boron compounds which can be advantageously employed are those represented by the empirical formulae $BR_3$ or $R_xBX_y$ wherein each R is independently a hydrocarbyl group having from 1 to about 20, preferably from 1 to about 10, carbon atoms; X is a halogen, preferably chlorine or bromine; and each x and y independently has a value of zero, 1, 2 or 3 the sum of which is 3. Particularly suitable boron compounds include, for example, triethyl boron, triphenyl boron, diethyl boron chloride, boron tribromide, mixtures thereof and the like.

Suitable transition metal compounds which can be employed in the present invention include those represented by the empirical formulae $Tm(OR)_yX_{x-y}$ and $Tm(OR)_{x-2}O$, wherein Tm is a transition metal selected from groups IVB, VB or VIB; each R is independently a hydrocarbyl group, preferably alkyl or aryl, having from 1 to about 20, preferably from 1 to about 10, carbon atoms; each X is independently a halogen, preferably chlorine or bromine; x has a value equal to the valence of Tm and y has a value from 1 to the valence of Tm.

Particularly suitable transition metal compounds include, for example, tetraethoxy titanium, tetraisopropoxy titanium, tetra-n-butoxy titanium, di-n-butoxy titanium dichloride, tetraphenoxy titanium, tetra-n-propoxy titanium, tetra-(2-ethylhexoxy) titanium, tri-n-butoxy vanadium oxide, oxyvanadium trichloride, triisopropoxy vanadium oxide, zirconium tetra-n-butoxide, zirconium tetra-n-propoxide, zirconium tetra-isopropoxide, mixtures thereof and the like.

Suitable organomagnesium components which can be employed in the present invention include those represented by the empirical formula $MgR''_2 \cdot xMR''_y$ wherein each R'' is independently hydrocarbyl or hydrocarbyloxy, M is aluminum, zinc or mixtures thereof, and x is about zero to about 10, preferably 0.001 to about 5, most preferably from about 0.01 to about 2.5, and y denotes the number of hydrocarbyl and/or hydrocarbyloxy groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms being preferred. Hydrocarbyl is preferred over hydrocarbyloxy.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magensium halides with the halogen-free organomagnesium compounds being more desirable.

Among the halide sources which can be employed herein are the active non-metallic halides and metallic halides.

Suitable non-metallic halides are represented by the empirical formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably an active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the empirical formula $MR_{y-a}X_a$ wherein M is a metal of Groups IIB, IIIA or IVA, of Mendeleev's Periodic Table of Elements, R is a monovalent organic radical, X is a halogen, y has a value corresponding to the valence of M and a has a value from 1 to y. Preferred metallic halides are aluminum halides of the empirical formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any organic radical provided that they do not contain functional groups that poison conventional Ziegler catalysts. Preferably such organic moieties do not contain active hydrogen, i.e., those sufficiently active to react with the Zerewitinoff reagent.

In preparing the reaction product or complex of the present invention from said boron compounds and said transition metal compounds, the two components are simply mixed together in a suitable solvent at any suitable temperature, usually from about $-50°$ C. to $100°$ C., preferably from about $0°$ C. to about $30°$ C., for a time sufficient to cause a color change in the reaction mixture. At lower temperatures longer times are required.

The reaction time is also affected by the concentration of the reactants, e.g. low concentrations require longer times at any given temperature than do higher concentrations. The solvents which can be employed include those suitable for preparing the catalysts of this invention with the hydrocarbon solvents being most suitable.

The color change varies depending upon the particular components employed.

The magnesium halide can be preformed from the organomagnesium compound and the halide source or it can be prepared in situ in which instance the catalyst is prepared by mixing in a suitable solvent (1) the organomagnesium component; (2) the halide source and (3) the reaction product or complex formed by mixing (a) said transition metal compound and (b) said boron compound.

The foregoing catalyst components are combined in proportions sufficient to provide atomic ratios as previously mentioned.

In cases wherein neither the organomagnesium component nor the halide source contains aluminum or contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below $180°$ C. are employed, the atomic ratios of Al:Ti may be from about 0.1:1 to about 200:1, preferably from 1:1 to about 150:1. However, when polymerization temperatures above $180°$ C. are employed, the aluminum compound is used in proportions such that the Mg:Al ratio is more than 0.3:1, preferably from 0.5:1 to 10:1, and Al:Ti ratio is less than 120:1, preferably less than 75:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100°$ to about $200°$ C., preferably from about $0°$ to about $100°$ C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In order to maximize catalyst efficiency, the catalyst is prepared by mixing the components of the catalyst in an inert liquid diluent in the following especially preferred order: organomagnesium compound, halide source, the aluminum compound if required, and the reaction product or complex transition metal compound and boron compound.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about $0°$ to about $300°$ C., preferably at solution polymerization temperatures, e.g., from about $130°$ to about $250°$ C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 (345 kPa) to about 1000 psig (6895 kPa), especially from about 100 (689.5 kPa) to about 700 psig (4826 kPa). However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization or, in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively narrow molecular weight distribution.

The following examples are given to illustrate the invention, and should not be construed as limiting its scope. All percentages are by weight and all parts are by molar or atomic ratio unless otherwise indicated.

In the following examples, the melt flow index values were determined by ASTM D 1238-70 and the density values were determined by ASTM D 1248.

The following designations are employed in the examples and comparative experiments.

ATE triethyl aluminum in Isopar ® E
DEAC diethylaluminum chloride in Isopar ® E
EADC ethyl aluminum dichloride in Isopar ® E
TiPT tetraisopropyl titanate
TEB triethyl boron
TiPT.TEB reaction mixture from mixing tetraisopropyl titanate and triethyl boron in 1:1 molar ratio in Isopar ® E. This mixture was light purple in color.
DBM n-butyl-sec-butyl magnesium
DNHM di-n-hexyl magnesium
$MgCl_2$ magnesium chloride prepared from the reaction of DNHM with anhydrous HCl in Isopar ® E.
$BBr_3$ tribromoboron
Isopar ® E an isoparaffinic hydrocarbon fraction having a boiling range of 116°–134° C., commercially available from Exxon
TiPT-$BBr_3$ reaction mixture resulting from mixing TiPT and $BBr_3$ in a molar ratio of 1:1 in Isopar ® E. This mixture was straw yellow in color.

A. CATALYST PREPARATION

The catalysts were prepared by mixing the components in the order listed under an inert atmosphere. The catalysts were employed in the polymerization reaction within about 5 minutes after preparation.

EXAMPLE 1

48.0 ml of Isopar ® E
0.41 ml of 0.91 M EADC
0.75 ml of 0.01 M TiPT-TEB
0.84 ml of 0.357 M DNHM
atomic ratio: B/Mg/Cl/Al/Ti = 1/40/100/50/1
excess Cl/Al = 0.4/1

COMPARATIVE EXPERIMENT A 48.0 ml of Isopar ® E
0.41 ml of 0.91 M EADC
0.75 ml of 0.01 M TiPT
0.84 ml of 0.357 M DNHM
atomic ratio: B/Mg/Cl/Al/Ti = 0/40/100/50/1
excess Cl/Al = 0.4/1

EXAMPLE 2

43.9 ml of Isopar ® E
5.0 ml of 0.16 M $MgCl_2$
0.15 ml of 1.0 M DEAC
0.75 ml of 0.01 M TiPT-TEB
0.22 ml of 1.0 M ATE
atomic ratio: B/Mg/Cl/Al/Ti = 1/40/100/50/1
excess Cl/Al = 0.4/1

COMPARATIVE EXPERIMENT B 43.9 ml of Isopar ® E
5.0 ml of 0.06 M MgCl$_2$
0.15 ml 1.0 M DEAC
0.75 ml of 0.01 M TiPT-TEB
0.22 ml of 1.0 M ATE
atomic ratio: B/Mg/Cl/Al/Ti=0/40/100/50/1
excess Cl/Al=0.4/1

POLYMERIZATION

The reactor was nitrogen purged, loaded with about 2 liters of Isopar ® E, and heated to 150° C. Excess nitrogen was vented as the reactor heated (~100° C.). When the temperature stabilized, the reactor pressure was about 20 psig (138 kPa). Hydrogen was then added from a 75 cc bomb so that the differential pressure in the bomb was 200 psig (1379 kPa). The reactor pressure was about 25 psig (172 kPa). Ethylene was added to give a partial pressure of 120 psig (827 kPa). Total reactor pressure was 145 psig (1000 kPa). The catalyst (7.5 mls or 0.00113 mmoles Ti) was then injected through a nitrogen purged bomb. The initial exotherm was controlled by applying cooling air to the reactor walls. Ethylene was fed on demand to keep the reactor pressure at 145 psig (1000 kPa). After 30 minutes, the polymer was recovered and dried at 100° C. to remove solvent. Physical properties were determined for the resulting polymer. The results are given in the Table.

EXAMPLES 3 AND 4 AND COMPARATIVE EXPERIMENT C

In these examples and comparative experiment, the following titanium components were employed.

Titanium Component I (Comparative Experiment C)

TiPt (3.36 M) was diluted with Isopar ® E to 0.025 M. This mixture was clear.

Titanium Component II (Example 3)

A mixture of 10 ml of 1 M TiPT with 10 ml of 1 M BBr$_3$ diluted to 0.025 M with Isopar ® E. This mixture was yellow in color.

Titanium Component III (Example 4)

A mixture of 10 ml of 0.5 M TiPT-BBr$_3$ with 10 ml of 0.5 M TiPT-TEB diluted to 0.025 M with Isopar ® E. This mixture was gold in color.

These examples and the comparative experiment were prepared in a manner similar to Examples 1-2 and Comparative Experiments A-B employing the listed components added in the order listed.

EXAMPLE 3

97.60 ml Isopar ® E
0.80 ml 0.94 M EADC
1.00 ml 0.60 M DBM
0.60 ml Ti component II (0.025 M)
atomic ratio: B/Mg/Cl/Al/Ti=1/40/100/50/1
excess Cl/Al=0.4/1

EXAMPLE 4

97.60 ml Isopar ® E
0.80 ml 0.94 M EADC
1.00 ml 0.60 M DBM
0.60 ml Ti component III
atomic ratio: B/Mg/Cl/Al/Ti=1/40/100/50/1
excess Cl/Al=0.4/1

COMPARATIVE EXPERIMENT C 97.70 ml Isopar ® E
0.80 ml 0.94 M EADC
1.00 ml 0.60 M DBM
0.60 ml Ti Component I
atomic ratio: B/Mg/Cl/Al/Ti=0/40/100/50/1
excess Cl/Al=0.4/1

POLYMERIZATION

Each of the catalysts were polymerized by the general procedure described above for Examples 1-2 and Comparative Experiments A-B except that total ethylene pressure was 135 psig (931 kPa), the hydrogen pressure was 19 psig (131 kPa) and total system pressure was 220 psig (1517 kPa). In addition, 10 cc (or 0.0015 mmole Ti) of catalyst was injected. The results are given in the Table.

TABLE

| EXAMPLE OR COMPARATIVE EXPT. NO. | CATALYST EFFICIENCY g polymer/g Ti | MELT FLOW INDEX at 190° C. g/10 min. | DENSITY at 25° C. g/cm$^3$ |
|---|---|---|---|
| 1 | 3.82 × 10$^6$ | 7.17 | N.D. |
| A | 2.63 × 10$^6$ | 6.68 | N.D. |
| 2 | 3.52 × 10$^6$ | 7.75 | 0.9661 |
| B | 3.02 × 10$^6$ | 6.83 | 0.9659 |
| 3 | 3.88 × 10$^6$ | 12.63 | 0.9655 |
| 4 | 2.81 × 10$^6$ | 5.16 | 0.9628 |
| C | 2.27 × 10$^6$ | N.D. | N.D. |

*N.D. = not determined.

We claim:
1. The reaction product or complex formed from the admixture of
   (a) at least one transition metal compound represented by the empirical formulae Tm(OR)$_y$X$_{x-y}$ or Tm(OR)$_{x-2}$O, wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and
   (b) at least one boron compound represented by the empirical formula BX$_3$ wherein X is a halogen; and
wherein components (a) and (b) are mixed in proportions such that the atomic ratio of B:Tm is at least about 0.1:1.
2. The reaction product or complex of claim 1 wherein in component (a) Tm is titanium, each R is independently a hydrocarbyl group having from 2 to about 10 carbon atoms and X is chlorine or bromine; and wherein component (b) has the formula BX$_3$ wherein X is bromine and the B:Ti atomic ratio is from about 0.2:1 to about 10:1.
3. The reaction product or complex of claim 1 wherein in component (a) R is a saturated aliphatic hydrocarbyl group and the B:Ti ratio is from about 0.5:1 to about 2:1.
4. The reaction product or complex of claims 1, 2, or 3 wherein component (a) is titanium tetraethoxide, titanium tetra-n-propoxide, titanium tetra-isopropoxide, titanium tetra-n-butoxide or titanium tetra-(2-ethylhexoxide) and component (b) is boron tribromide.
5. The catalytic reaction product of
   (A) the reaction product or complex formed from the admixture of

(1) at least one transition metal compound represented by the empirical formulae $Tm(OR)_y X_{x-y}$ or $Tm(OR)_{x-2}O$, wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and (2) at least one boron compound represented by the empirical formula $BX_3$ wherein X is a halogen; and (B) a magnesium halide resulting from the reaction of (1) an organomagnesium compound represented by the empirical formula $MgR''_2 \cdot xMR''_y$ wherein M is aluminum or zinc, each R'' is independently a hydrocarbyl or hydrocarbyloxy group having from 1 to about 20 carbon atoms, x has a value from zero to 10 and y has a value corresponding to the valence of M; with (2) a halide source selected from (a) an active non-metallic halide, said non-metallic halide corresponding to the formula R'X wherein R' is hydrogen or a hydrocarbyl group such that the hydrocarbyl halide is at least as active as sec-butyl chloride and does not poison the catalyst and X is halogen or (b) a metallic halide corresponding to the empirical formula $MR_{y-a}X_a$ wherein M is a metal of Group IIB, IIIA or IVA of Mendeleev's Periodic Table of Elements, R is a monovalent hydrocarbyl radical, X is halogen, y is a number corresponding to the valence of M and a is a number from 1 to y; and (C) when the organomagnesium component and/or the halide source provides insufficient quantities of aluminum, an aluminum compound represented by the empirical formula $AlR_{y'}X_{y''}$ wherein R and X are as defined above, y' has a value of 2 or 3 and y'' has a value of zero or one with the sum of y' and y'' being three; and wherein the components are employed in quantities which provide an atomic ratio of the elements Mg:Tm of from about 1:1 to about 200:1; B:Tm at least about 0.1:1; Al:Tm of from about 0.1:1 to about 200:1 and an excess X:Al of from about 0.0005:1 to about 5:1.

6. The catalytic reaction product of claim 5 wherein (a) in component (A-1), Tm is titanium, each R is independently a hydrocarbyl group having from 1 to about 10 carbon atoms and X is chlorine or bromine; (b) in component (A-2), the boron compound is represented by the empirical formula $BX_3$ wherein X is bromine; (c) in component (B-1), M is aluminum and R'' is a hydrocarbyl group having from 1 to about 10 carbon atoms and x has a value of from about 0.001 to about 5; (d) in component (B-2-a), R' is hydrogen or a tertiary butyl group and X is chlorine; (e) in component (B-2-b), M is a metal from Groups IIIA or IVA, y-a is zero or 1 and X is chlorine; (f) in component (C), the aluminum compound is a trialkyl aluminum compound wherein the alkyl groups independently have from 1 to about 10 carbon atoms; and (g) the components are employed in quantities so as to provide atomic ratios of Mg:Ti of from about 2:1 to about 100:1; B:Ti from about 0.2:1 to about 10:1; Al:Ti of from about 0.5:1 to about 150:1 and excess X:Al of from about 0.002:1 to about 2:1.

7. The catalytic reaction product of claim 6 wherein (a) in component (A-1), each R is independently a saturated aliphatic hydrocarbyl group; (b) in component (B-1), x has a value of from about 0.15 to about 2.5; and (c) the components are employed in quantities so as to provide atomic ratios of Mg:Ti of from about 5:1 to about 75:1; B:Ti from about 0.5:1 to about 2:1; Al:Ti of from about 1:1 to about 100:1; and excess X:Al of from about 0.01:1 to about 1.4:1.

8. The catalytic reaction product of claim 7 wherein (a) component (A-1) is titanium tetraethoxide, titanium tetra-n-propoxide, titanium tetra-isopropoxide, titanium tetra-n-butoxide, or titanium tetra-(2-ethylhexoxide); (b) component (A-2) is boron tribromide; (c) component (B-1) is a dialkyl magnesium compound wherein the alkyl groups independently have from 1 to about 10 carbon atoms; and (d) component (B-2) is substantially anhydrous hydrogen chloride, ethyl aluminum dichloride or tin tetrachloride.

9. The catalytic reaction product of claims 5, 6, 7 or 8 wherein the components are added in the order (B-1), (B-2), (C) if employed and (A).

10. The catalytic reaction product of claims 5, 6, 7 or 8 wherein the components are added in the order (B-1), (B-2), (A) and (C) if employed, and provided that the halide source, (B-2), is not a tin compound.

11. In a catalyst composition comprising a magnesium halide, a transition metal compound and a boron compound, said composition having an atomic ratio of the elements Mg:Tm of from about 1:1 to about 200:1; B:Tm at least about 0.1:1; Al:Tm of from about 0.1:1 to about 200:1; and an excess X:Al of from about 0.0005:1 to about 5:1; the improvement which comprises forming a reaction product or complex of the transition metal compound and the boron compound prior to preparation of the catalyst therefrom; wherein said boron compound is represented by the formula $BX_3$ wherein X is halogen.

12. The catalyst composition of claim 11 wherein the atomic ratios of the elements are Mg:Tm of from about 2:1 to about 100:1; B:Tm of from about 0.2:1 to about 10:1; Al:Tm of from about 0.5:1 to about 150:1; and excess X:Al of from about 0.002:1 to about 2:1.

13. The catalyst composition of claim 11 wherein the atomic ratios of the elements are Mg:Tm of from about 5:1 to about 75:1; B:Tm of from about 0.5:1 to about 2:1; Al:Tm of from about 1:1 to about 100:1; and excess X:Al of from about 0.01:1 to about 1.4:1.

* * * * *